April 15, 1952

C. JOHNSON 2,593,310

MACHINE TOOL CONTROL

Filed Nov. 6, 1946

INVENTOR.
CLARENCE JOHNSON
BY
*Raymond D. Junkins*
ATTORNEY

FIG. 2

INVENTOR.
CLARENCE JOHNSON

FIG. 4

INVENTOR.
CLARENCE JOHNSON

Patented Apr. 15, 1952

2,593,310

UNITED STATES PATENT OFFICE 2,593,310

MACHINE TOOL CONTROL

Clarence Johnson, Orfordville, Wis., assignor to Bailey Meter Company, a corporation of Delaware Application November 6, 1946, Serial No. 708,033

2 Claims. (Cl. 82—14)

This invention relates to the art of contour control or object duplication and is particularly directed to the provision of apparatus, systems and methods for material forming machines whereby a work piece is formed to a contour or configuration determined by a master, pattern, template, or the like which dictates the desired configuration.

Specifically, although not limited thereto, the disclosure is directed to the control and operation of a metal working lathe wherein a tracer, or tracers, scans a pattern for reproducing in the work piece the configuration of the pattern.

In simplest language, the tracer which scans the pattern provides a valve or port bleeding a pressure fluid such as compressed air to the atmosphere from a substantially constant pressure source. The rate of bleed to the atmosphere is determined by the freedom of the port under the dictates of the tracer and pattern. The rate of flow of the air to the atmosphere and the consequent variations in pressure of the air due to such variations in rate of discharge are utilized through improved relay mechanisms to control fluid motors for power operation of the machine. Preferably the fluid motors are actuated by a hydraulic fluid such as oil, and the motors may be piston-cylinder combinations or rotary fluid motors. The general purpose accomplished by the power devices is to relatively move the tracer and tool in regard with the pattern and work piece. Such a system combines and utilizes the advantages of an air tracer with hydraulic oil power means.

It is quite possible to utilize a single fluid control and power system wherein the fluid is oil under pressure. Known systems of this type, however, require a tracer which is of considerable size and complexity. The fluid leaving the port or other similar opening of the tracer mechanism does in my invention discharge freely to the atmosphere adjacent the tracer.

The preferred form of my invention employs a tracer discharging air under a pressure of the order of 35 p. s. i. freely to the atmosphere at a controllable rate. The back pressure resultant is utilized in a simple relay mechanism to control oil as a hydraulic fluid under a pressure in the order of 300 p. s. i. for positioning power devices. Thus I combine the many advantageous features of air discharging freely to the atmosphere in a tracer mechanism with the advantages of a relatively higher pressure incompressible fluid for the power devices. My preferred tracer is of relatively small size and simplicity as compared to known liquid tracers previously mentioned.

In the present invention I utilize what is commonly termed a rotating master of substantially the same size and configuration as the desired resultant work piece. Such master is continually scanned by a plurality of tracers, each of which individually controls a power mechanism for relatively moving the tool and work piece, while one of the tracers relatively moves itself toward or away from the work piece and the other tracer relatively moves itself along the work piece.

While I illustrate and describe a preferred embodiment of my present invention, it is of course to be understood that this is by way of example only and not to be considered as limiting. In other words, the fact that I illustrate and describe two tracers controlling piston-cylinder power devices does not limit my present invention below a plurality of tracers controlling fluid pressure power devices.

Obviously a contour control or object duplicator of the type forming the subject matter of my present invention may be employed with material forming machines or machine tools of various types, such as milling machines, lathes, slotters, planers, die sinking machines or other machines in which the relative feed between the tool and the work may be suitably controlled. I have chosen to illustrate and describe my invention as applied particularly to metal turning engine lathes. Further applications and modifications of my invention will be readily apparent.

In the present embodiment I have found it desirable to utilize a pattern of substantially the exact shape I desire to form the work piece. This greatly simplifies the construction of the pattern and the checking of finished work. An advantage of my invention is that I may construct the pattern as required to produce the desired shape of the work piece.

One object of my invention is to provide an improved contour control for a metal working lathe wherein the master is substantially a duplicate of the desired work piece, and wherein it is rotated with the work piece.

A further object is to provide a plurality of tracer mechanisms continuously scanning the master when the machine is in operation, and so arranged that one of the tracers controls the transverse positioning of the tool, while the second tracer controls the longitudinal movement of the tool along the axis of the work piece.

Figure 1:
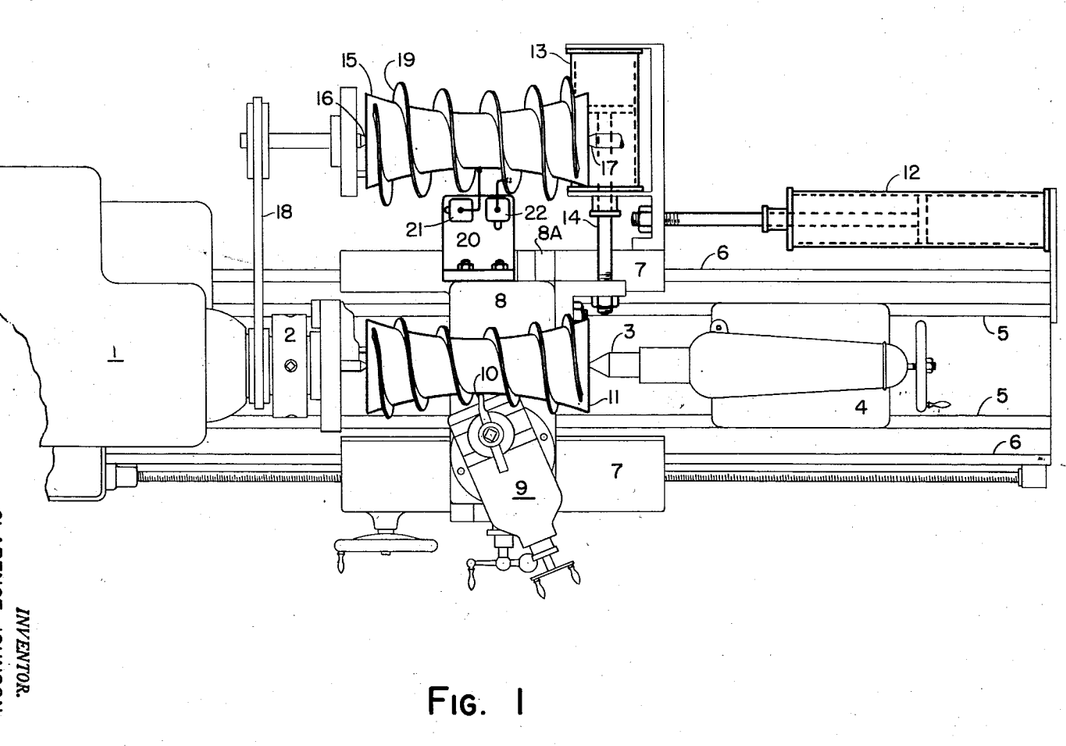
Fig. 1 is a somewhat diagrammatic plan view of the engine lathe showing particularly the pattern, work piece, tracers and power positioning devices.

Referring now to Fig. 1, I show my invention applied to an engine lathe 1 having a head stock 2 adapted to be rotated by any suitable means. A carriage 4 is movable longitudinally along the bed of the lathe on suitable ways 5 and supports a tail stock 3. Also movable longitudinally along the bed of the lathe on suitable ways 6 is a carriage 7 upon which is mounted a cross-slide 8 movable on ways 8A transversely of the bed of the lathe.

Mounted on and carried by the cross-slide 8 is an angularly positionable compound rest 9 forming a tool support for a tool 10. Movements of the tool 10 relative to a work piece 11 are produced through the agency of an hydraulic power device 12 acting longitudinally and through the agency of an hydraulically actuated power device 13 adapted to position the cross-slide 8 and compound rest 9 transversely along the ways 8A. The hydraulic device 13 is supported by the carriage 7 in a manner such that its piston rod 14 will position the cross-slide 8, compound 9, and tool 10 transversely of the lathe along the ways 8A while the entire unit 13 is positioned with the carriage 7 axially of the lathe by the power device 12.

It is evident from the above that the work piece 11 is supported in customary manner between the headstock 2 and the tailstock 3 and is rotated at preselected speeds by the usual means (not shown). The cutting tool 10 is moved longitudinally along the work piece through the agency of the hydraulic means 12 and transversely relative to the work piece through the agency of the hydraulic means 13.

In the present embodiment I provide a master or pattern 15 for determining the final shape of the work piece 11. The pattern 15 is substantially a sample of the desired work piece, although in certain respects it may be distorted so that the finished work piece will be properly produced. Herein it differs from the finished work piece 11 only as to the height of the fin 19 above the main body and for a purpose which will be later explained. It is supported for rotation between centers 16, 17 and is rotated by and with the headstock 2 through the agency of a belt 18 or similar transmission means. It is preferable, in the present embodiment, to have the pattern 15 rotated in the same direction and at the same speed as the work piece 11.

Supported by and moved with the cross-slide 8 is an extension 20 supporting two tracer assemblies 21 and 22 whose feelers scan the master 15 as the carriage 7 is traveled longitudinally along the ways 6. I have shown in Fig. 1 that the feeler of the tracer 21 is in engagement with the main body of the pattern 15, while the feeler arm of the tracer 22 is in engagement with the side of the fin 19. With reference to other figures of the drawing the operation will be explained more in detail. Let it suffice here to say that the transverse motor 13 is under the control of the tracer 21, whereas the longitudinal motor 12 is under the control of the tracer 22.

The particular shape of the pattern 15, which has been chosen for discussion in the present specification, is perhaps somewhat unusual, but it has been chosen purposely from the standpoint of illustrating the versatility of the control system herein described. The particular pattern 15 represents a Venturi shaped nozzle for fluid flow. Its main body has an exterior of a double conical nature, tapered from either end along a curved path to a mid point of lesser diameter than the two ends. This might well be a straight taper or it might be that the general taper from one end to the mid point is of a different inclination or curvature than from the other end to the mid point.

Wrapped around the body of the pattern is a fin or wormlike projection 19 for radiation cooling purposes. As shown, the fin 19 is of uniform height or extension outwardly from the main body of the pattern and of a generally uniform thickness. It is, however, shown as being of non-uniform pitch in that the convolutions are closer together at the greater diameter of the pattern than they are at the lesser diameter. In the particular nozzle being machined these convolutions are so spaced or pitched as to theoretically given a uniform heat transfer to the surrounding atmosphere through the varying spacing of the convolutions in accordance with the varying diameter of the main body of the nozzle.

After the exterior of the work piece is machined in conformity to the dictates of the master 15 it will be properly bored to form a Venturi nozzle through which a fluid is to be passed. The present description will include only the machining of the exterior of the work piece 11 in conformity with the dictates of the master 15.

It will be evident that the pattern 15 is representative of a class of object shapes wherein a body portion of relatively lesser diameter has a more or less regular or continuous protuberance like a worm or spiral wrapped around it. An example is the hour-glass worm of an automobile steering mechanism wherein the pitch may be substantially uniform. Another example is the tapered meat or food grinder worm in which the pitch is not uniform.

Figure 2:
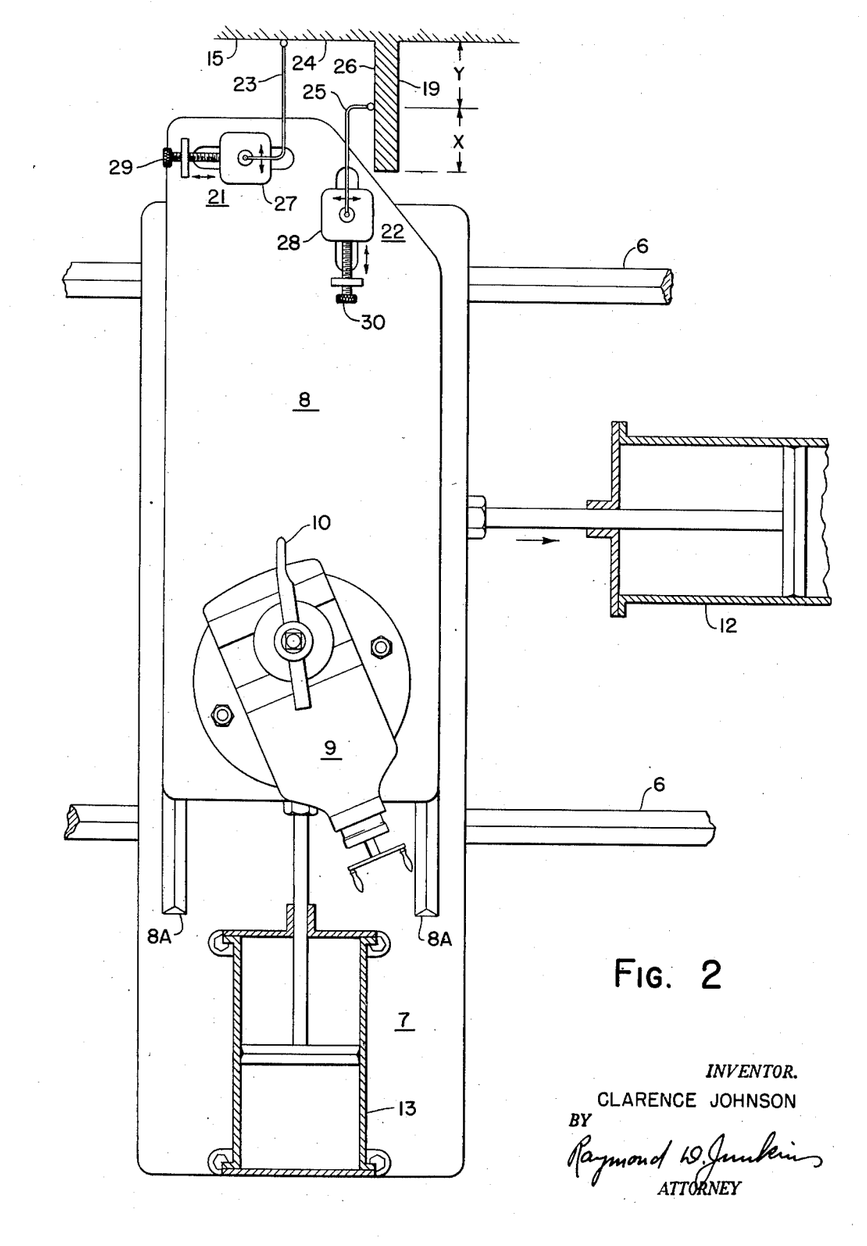
Fig. 2 is an enlarged diagrammatic drawing of a portion of Fig. 1.

Referring now to Fig. 2, I show therein in very schematic fashion a portion only of the assembly of Fig. 1. I have rearranged and distorted certain of the parts merely for clarity of understanding in explanation.

It will be observed that the carriage 7 is positioned longitudinally of the lathe along the ways 6 through the agency of the hydraulic motor 12 and preferably from left to right of the drawing for a single cutting travel of the tool 10 along the work piece 11. The cross-slide 8 is positioned transversely across the carriage 7 along the ways 8A through the agency of the hydraulic motor 13.

Positioned with the cross-slide 8 is the tracer assembly 21 having a tracer arm 23 contacting the surface 24 of the main body of the pattern 15 for scanning the same as the carriage 7 is moved along the ways 6 from left to right. Also carried by the cross-slide 8 is the tracer assembly 22 having a tracer arm 25 riding the left-hand surface 26 of the projecting fin 19. Preferably the cooperation of the tracer arm 23 with the body surface 24 of the pattern 15 controls the transverse positioning motor 13, whereas the cooperation of the tracer arm 25 with the surface 26 of the fin 19 controls movement of the motor 12.

The extent of the fin 19 from the body surface 24 is preferably greater than the desired extension of the fin on the finished work piece 11. I have indicated in Fig. 2 that the distance X is the desired extension of the fin on the finished work piece and that the distance Y is the additional extension on the pattern 15 for a purpose which will be mentioned later.

For clarity of understanding I have shown in Fig. 2 that the tracer assemblies 21 and 22 are supported in substantially the same horizontal plane from the cross-slide 8. This indicates a considerable lead of the arm 25 over the arm 23 as the assembly travels longitudinally of the lathe. Actually, the assemblies 21, 22 would not be supported from the cross-slide 8 in substantially the same horizontal plane, but at approximately 90° to each other, and in such a manner that the tracer arms 23, 25 would converge toward each other from the assemblies 21, 22 until the contacting ends of the arms 23, 25 may under certain conditions occupy substantially the same space with the assemblies in substantially the same vertical plane. However, each of the assemblies is provided with hand adjustability for spacing the contacting ends of the arms 23, 25 both radially relative to the master 15 as well as longitudinally thereof. I have felt that the showing of Fig. 2 is more adaptable to explanation than if the assemblies were shown more nearly in the same vertical plane radially of the axis of the master 15.

The tracer assemblies 21, 22 are in general of the type disclosed and claimed in the copending application of Frederick A. Barnes, Patent No. 2,436,373, issued February 24, 1948, entitled "Machine Tool Control." The assembly 21 includes a body member 27 positionable (as indicated by the arrows) along a path parallel to the axes of the work piece 11 and the master 15 through the agency of a hand adjusting screw 29. Similarly, the tracer assembly 22 includes a body portion 28 adjustable transversely relative to the work piece and master through the agency of a hand adjusting screw 30.

The tracer assemblies 21 and 22 are similar. Considering assembly 21, the tracer arm 23 is movable relative to the housing 27 along a path as indicated by the arrow on the housing 27. The relative positioning of the members 23, 27 controls the value of an air loading pressure utilized in controlling the hydraulic motor 13 for positioning the cross-slide 8 on the carriage 7. The assembly includes a valve or port freely discharging a pressure fluid to the atmosphere from a relatively constant pressure source. As the pattern or template changes in configuration the resulting movement of the tracer arm relative to the tracer body varies the rate of discharge of the pressure fluid from the port to the atmosphere, and consequently the pressure of the fluid at the entrance to the port. In the present embodiment I preferably utilize air as the pressure fluid inasmuch as this may be freely discharged to the atmosphere without costly wastage or without undesirable flooding of oil or liquid pressure fluid over the pattern and machine tool. It will be understood, however, that in function the tracer assembly is not limited to the use of air.

As mentioned in the introduction to the present specification, I preferably utilize air as a pressure fluid and control its rate of discharge, from a normally constant pressure source, in varying degree directly to the atmosphere. As will be seen later, such an arrangement requires only a single flexible tubing connection joining the assembly 21 and necessarily flexing to take care of the movement of the carriage 7 along the lathe bed. Furthermore, the assembly 21 is of a minimum size and weight. No nuisance or damage is accomplished whatsoever by having air bled to the atmosphere adjacent the master 15 or other parts of the complete machine tool assembly. The wastage of such air is insignificant in cost as compared to oil or other pressure fluids which might be utilized. With air supplied under substantially constant pressure to the assembly 21, the discharge thereof to the atmosphere varies the back pressure or pressure between the discharge port and the source of uniform pressure. Such a varying or controlled back pressure is then utilized to control the hydraulic motor 13, as will be later explained.

When the tracer feeler 23 is not contacting the surface of revolution 24 of the pattern 15, it is in what I term an "idle" or uninfluenced position with respect to the tracer body 27. Under this condition the air bleed valve is so biased as to result in motion of the cross-slide 8 (and tracer 21) toward the surface 24. Such movement continues until the surface 24 is contacted by the feeler 23 and the latter is deflected slightly to a "normal" position. Such deflection from an "idle" to a "normal" position varies the bleed rate to a value stopping further transverse motion of the cross-slide 8 along the ways 8A, and the result would be cylindrical turning if at the same time the carriage 7 were being traveled longitudinally along the ways 6. Such cylindrical turning would be accomplished if the tool is contacting the work and will persist so long as the feeler 23 scans a straight profile 24 parallel to the axis of the work piece.

Referring to Fig. 2, if the surface 24 recedes toward the top of the drawing while the feeler 23 is moving from left to right, then the cross-slide 8 and tracer assembly 21 will continually and gradually move upwardly on the drawing to follow such recession and attempt to return the relation of 23 to 27 at a previously mentioned "normal" pressure condition. The result is a taper turning of decreasing diameter.

If the surface 24 advances toward the center line of the lathe (downwardly in the drawing Fig. 2) the direction of deflection of the feeler arm 23 relative to housing 27 will be in the opposite direction from the "normal" position, and the variation in control fluid pressure will be in a direction to result in a movement of the cross-slide 8 (downwardly on the drawing) to cause the tool 10 to recede from the axis of the work piece 11 and thus machine the work piece to a taper of increasing diameter.

The above examples are on the assumption of a continuous movement of the carriage 7 from left to right along the ways 6, such as might be accomplished by a lead screw in ordinary manner. I have pointed out, however, that the longitudinal travel of the carriage 7 is by the hydraulic motor 12 under the control of the tracer 22 whose feeler arm 25 is following the spirally wrapped fin 19.

In general, it may be said that the positional inter-relation between the elements 23, 27 under the dictates of the pattern surface 24 results in a positioning of the tool 10 toward or away from the axis of the work piece. At the same time the inter-relation of the elements 25, 28 under the dictates of the surface 26 results in a positioning of the carriage 7 along the ways 6 axially of the work piece. With reference to Fig.

Figure 3:
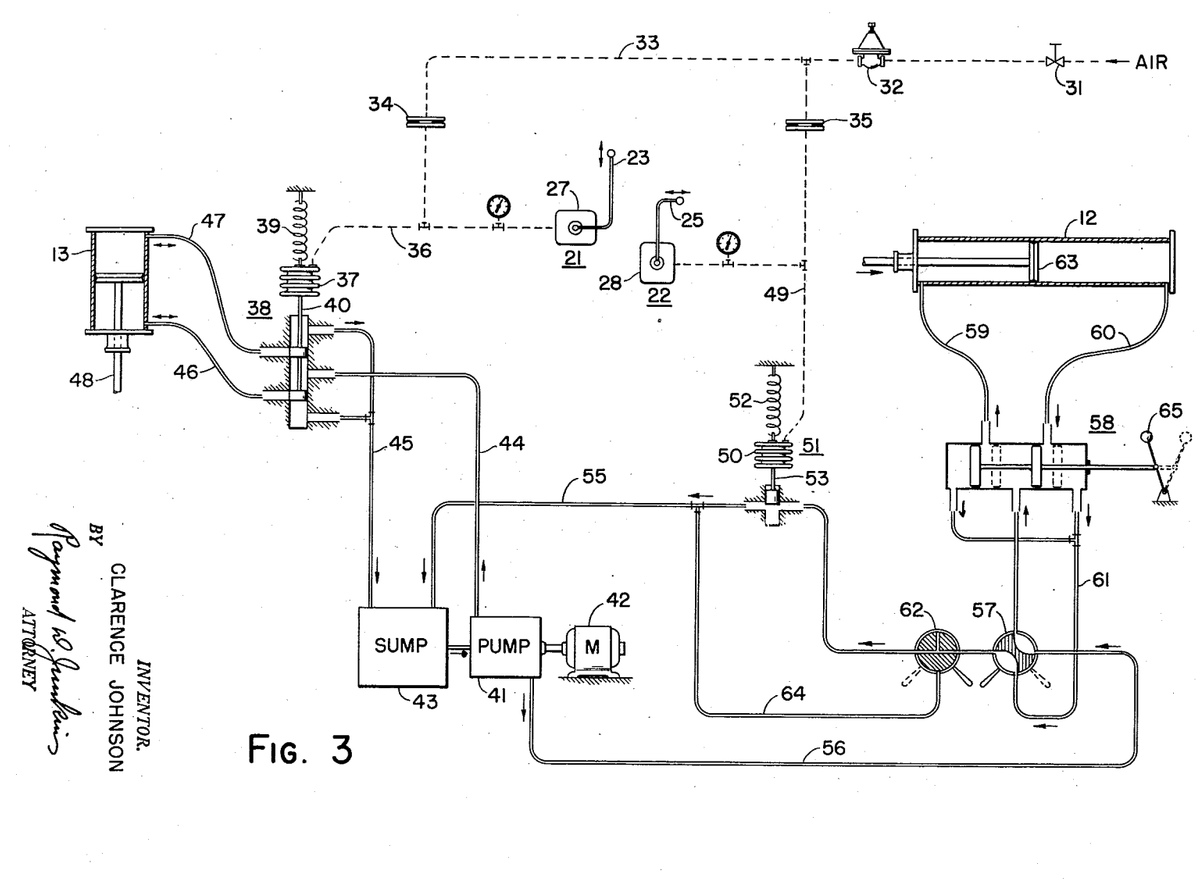
Figs. 3 and 4 show two different arrangements of pneumatic and hydraulic circuits in connection with Figs. 1 and 2.

3, I will now describe the actual control of the motors 12, 13 by the tracers 22, 21 respectively.

Air under pressure is supplied from any convenient source to a shutoff valve 31. After passing through a pressure reducing valve 32 the air in the pipe 33 is at a normally constant pressure of about 45 p. s. i., at the entrance to restrictive orifices 34, 35. The outlet of the orifice 34 is joined by a pipe 36 which communicates with the tracer assembly 21 and with a bellows 37 of a relay generally indicated at 38. The relay 38 is diagrammatically shown as having a pressure receiving bellows or expansible chamber 37, whose movement is opposed by a loading spring 39 and for positioning a pilot stem 40.

Oil under a relatively high pressure, as for example 200 p. s. i., is utilized as a hydraulic fluid supplied by a pump 41, driven by a motor 42, and drawing its supply of oil from a sump 43.

Oil is supplied to the relay 38 through a pipe 44 and drains from the pilot to the sump through a pipe 45. The hydraulic cylinder 13 is joined at its opposite ends with the pilot valve 38 by way of pipes 46, 47.

As shown in Fig. 3, the pilot stem 40 is in a shutoff or locking position relative to pipes 46, 47, so that movement of the piston rod 48 of the motor 13 is locked against movement. This is the condition which would prevail when the elements 23, 27 of the pilot assembly 21 are in what I have previously termed a "normal" condition, wherein the air loading pressure established by the tracer 21, in the pipe 36, is of such a value as to result in the pilot stem 40 being in the shutoff position shown in Fig. 3 and therefore the piston rod 48 locked in position, resulting thereby in cylindrical turning.

If air loading pressure in the pipe 36 departs from the "normal" value as caused by a variation from the "normal" relation between the elements 23, 27, then the pilot stem 40 is positioned either upwardly or downwardly an amount determined by the actual pressure within the pipe 36, effective upon the bellows 37. Such positioning of the pilot stem 40 will result (for example) in oil under high pressure being supplied through the pipe 47 to the cylinder 13 and being drained from the opposite side of the piston through the pipe 46. This results in a movement of the piston rod 48 in proper direction to "follow up" the movement of the tracer arm 23 by a follow-up movement of the housing 27, tending to return the interrelation of the elements 23, 27 to a "normal" position wherein the pipes 46, 47 are sealed off and further movement of the piston rod 48 is locked.

In other words, for a "normal" condition, as represented by cylindrical turning, the pilot stem 40 locks the pipes 46, 47 and thereby locks movement of the piston rod 48. If the pattern surface 24 recedes from the tracer feeler 23, or advances towards it, then the result is a movement of the cross-slide 8 in proper direction to turn the work piece to conformity with the dictates of the master, and at the same time to cause the tracer housing 27 to follow up (in the same direction) the prior movement of the feeler 23 in an attempt to regain "normal condition."

Referring again to Fig. 3, it will be observed that air through the orifice 35 supplies a pipe 49 joining the tracer assembly 22 and the bellows 50 of a variable fluid resistance 51 adapted to control the hydraulic motor 12. The fluid resistance 51 has a loading spring 52 cooperating with the bellows 50 in the positioning of a pilot stem 53, the latter constituting a variable resistance to the flow of oil from a pipe 54 to a pipe 55, the latter joining the sump 43.

Inasmuch as it is contemplated that movement of the carriage 7 will be in a single direction during a normal machining operation (in this example from left to right) oil under high pressure is supplied to the left-hand end (Fig. 3) of the cylinder 12 and is relieved from the right-hand end thereof. The oil supply to the left-hand end of the cylinder 12 is supplied under full pressure from the pump 41 through a pipe 56, a two-position valve 57, a direction switching valve 58, and a pipe 59. The right-hand end of the cylinder 12 is connected by way of a pipe 60, direction switching valve 58, a pipe 61, the two-position valve 57, a two-position valve 62, and the pipe 54, through the relay 51 and the pipe 55 to the sump 43. It will thus be observed that speed of travel of the piston 63, and consequently longitudinal travel of the carriage 7, will depend entirely upon the rate of release of oil from the right-hand end of the cylinder 12, and thus upon the variable restriction interposed by the pilot stem 53 between the pipes 54 and 55.

I have mentioned that longitudinal travel of the carriage 7, in this instance from left to right, is under the control of the tracer 22, and thereby of the inter-relation between elements 25, 28. Inasmuch as the element 25 rides the surface 26 of the spirally wrapped fin 19, it will be seen that the inter-relation between the elements 25, 28 depends upon the pitch of the fin 19 around the main body of the pattern 15. Thus the pitch of the fin 19 dictates the pressure of air within the pipe 49, effective within the bellows 50, for positioning the restrictor 53 and thus controlling the speed of travel of the piston 63. In other words, the longitudinal travel of the tool 10 axially along the work piece 11 is directly controlled by the positional spacing of the fin 19 axially along the pattern 15. Thus the speed of travel of the tool 10 axially of the work piece will be at a different rate near the ends of the pattern 15 than along the center of the pattern, for as I have previously pointed out the fin 19 is closer spaced at the ends than in the middle. This, of course, is not a requisite in the operation of my control system, but is an example which I have chosen as being a somewhat more diversified condition than if the fin were uniformly spaced along the master.

As I have mentioned, the present example contemplates a cutting travel of the tool 10 from left to right across the work piece 11. When such a travel has been completed it is desired to retract the cutting tool from engagement with the work piece and rapidly traverse the carriage 7 from right to left to be in position for a second cutting travel. I accomplish this by moving the two-position valves 57, 62 to the position shown in dotted line of the handles thereof. It will be understood that these two valves are in a common assembly or otherwise so arranged that a single handle may be moved to accomplish the simultaneous switching of both valves to the dotted line position. In such position it will be observed that oil under pressure, available through the pipe 56, passes through the valve 57 directly to the pipe 61, the switching valve 58 and to the pipe 60. At the same time oil is bled from the left-hand end of the cylinder 12 through the pipe 59, switching valve 58, the valve 57, the valve 62, and the pipe 64 to the drain pipe 55, thus by-passing the variable restriction 53. Under such condition oil under full pressure is available upon the right-hand side of the piston 63, while the left-hand side of the piston is freely open to the sump 43, so that the piston 63, and consequently the carriage 7, is traveled at maximum uniform speed from right to left. Preferably the limit of travel at either the right or left end is accomplished by travel limits arranged in cooperation between the cylinder 12 and the piston 63, or its related piston rod. Thus in the normal machining cut the tool may be allowed to run off the right-hand end of the work with the piston 63 stopping the travel of the tool when the piston reaches its extreme of travel. After the operator has switched the valves 57, 62 the rapid return of the tool to the left-hand end is freely accomplished until limited by the extent of motion of the piston 63 in that direction.

Under certain conditions it will be advisable to have the normal cutting travel of the tool 10 operate from right to left. In this event, the rapid return of the tool to a starting position would be from left to right. Such a reversal may be accomplished by moving the handle 65 of the valve 58 to the alternate position shown dotted in Fig. 3. Under this condition the internal lands of the valve 58 properly switch the normal incoming oil under high pressure from admission to the pipe 59 to admission to the pipe 60. All other functional operation remains the same except that normal cutting travel of the tool 10 is in this example from right to left.

Figure 4:
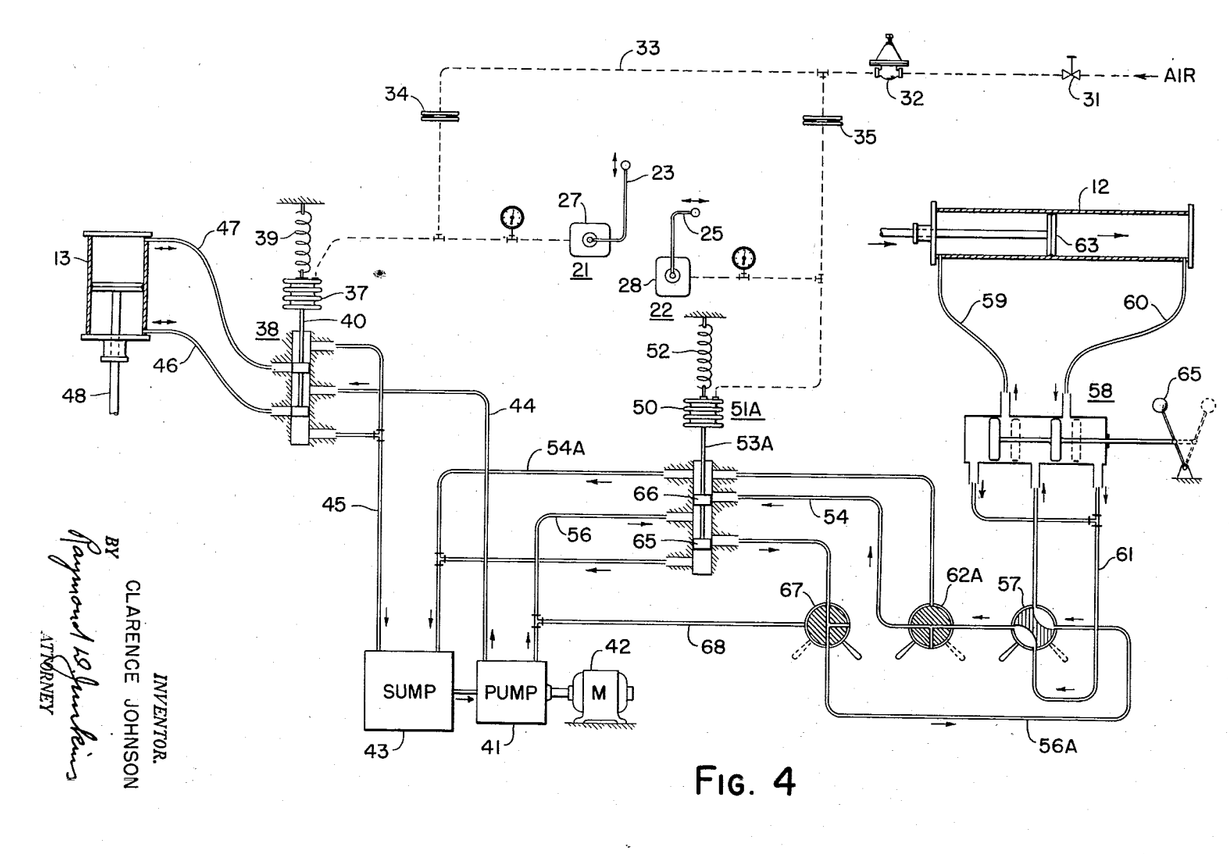

Referring now to Fig. 4, I show therein a modification of the air and oil circuits I have just described in connection with Fig. 3. The arrangement of Fig. 4 has certain advantages under some conditions of operation.

Specifically, the relay 51A differs from the relay 51 in that the movable pilot stem 53A has a land 65 variably throttling the oil supply through the pipe 56 to the pipe 56A and the left-hand end of the cylinder 12. The pilot stem 53A also has a land 66 variably throttling the drainage pipe 54 from the right-hand end of the cylinder 12 to the pipe 54A and to the sump 43. Thus a positioning of the stem 53A simultaneously varies the throttling of both the supply and discharge of oil at the opposite ends of the cylinder 12 and tends toward stability under certain conditions of operation.

A third two-position valve 67 is supplied and adapted to be simultaneously moved with the valves 57 and 62A. In the alternate (dotted) position of the three valves 57, 62A and 67 the oil under pressure through the pipe 56 by-passes the relay 51A and is admitted through a pipe 68 to the pipe 56A, the valve 57, the pipe 61, the valve 58, pipe 60, and to the right-hand end of cylinder 12. At the same time drainage from the left-hand end of the cylinder 12 is allowed through pipe 59, valve 58, valve 57, valve 62A, and pipe 54A to the sump.

Figure 5:
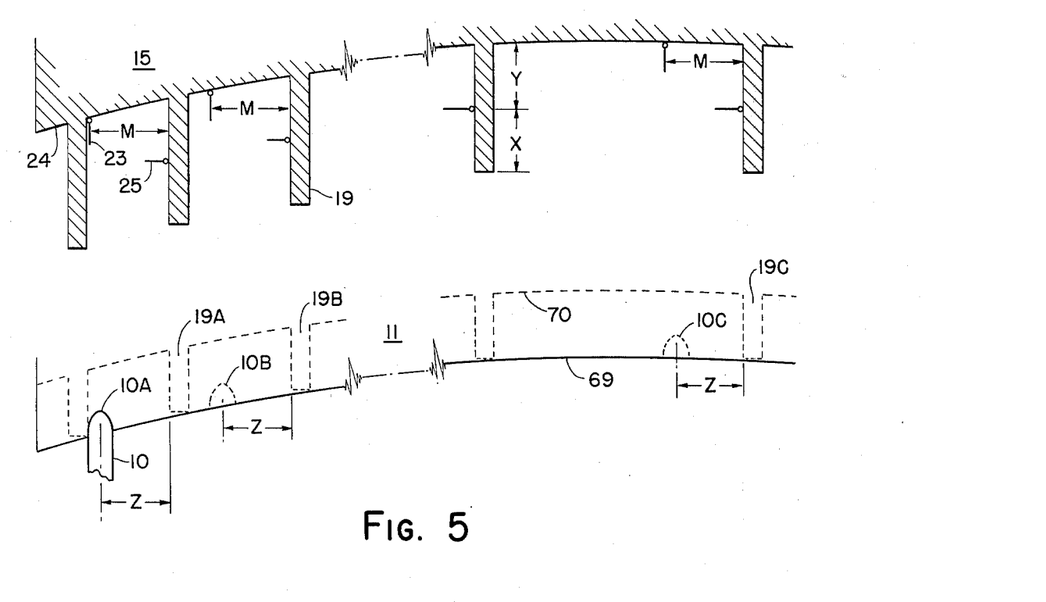
Figs. 5, 6, 7 and 8 are enlarged diagrammatic showings of a portion of the pattern and work piece under different stages of machining.

Attention should now be directed to Figs. 5, 6, 7, and 8, which are somewhat diagrammatic representations useful in explaining the actual operation of the system. It will be observed that in Figs. 5, 6 and 7 I show a portion each of the pattern and of the work piece, whereas in Fig. 8 I show a portion only of the work piece. Referring now in particular to Fig. 5, it will be observed that I show in the upper portion of this figure a horizontal section through the front portion of the pattern, in general from the left-hand end to and including the center portion. The desired surface 24 is a curved conical decrease in diameter from left to right with a nearly cylindrical central portion before the diameter progressively increases toward the unshown right end of the master. The fin 19 is of uniform height and thickness, but the height or projection from the surface 24 is greater than that desired on the work piece by an extent indicated at Y. This is purposely so that the tracer feeler 23 may be adjusted toward the right until it is in line (radially from the axis of the master) with the contacting end of the tracer feeler 25 without the two entangling or attempting to occupy the same position. Thus by having the effective movement of the feeler 25 over that portion of the fin 19 represented by X, I simulate the desired portion of the fin 19 except that it is spaced away from the surface 24 by the amount Y.

In Fig. 5 the work piece 11 is shown as having its rough casting outer surface represented at 69. The desired finished surface is represented at 70 by dotted line.

Assuming the rough blank work piece 69 being rotated and the carriage 7 at some starting position to the left, then the cross-slide 8 is moved toward the center line of the work piece until the tool 10 engages in cutting fashion as shown by the solid profile 10A, Fig. 5. Under this condition the feelers 23 and 25 are adjusted to engage the pattern 15 as shown at the upper left of Fig. 5.

The work and pattern are then placed in rotation and a single spiraling cut is taken across the work from left to right, with the resultant cut shown dotted, as at 10B and 10C. It will be observed that the cut at 10B and 10C is the same distance Z from the left-hand side of the fin sections 19B and 19C as it was from fin section 19A, because the spacing M of the feelers 23, 25 has not varied as the carriage 7 moves along the ways 6 toward the right. In other words, the travel of the tool longitudinally of the work has followed the spacing of the fin 19 as the master 15 is rotated, due to contact therewith of the feeler 25. The feeler 23 was followed by the fixed spacing M and thus the cut 10A, 10B and 10C has remained a fixed distance Z from the left-hand side of the variably spaced fin 19. At the same time while the tool 10 started in the position 10A, cleaning up on the right hand side of the fin, it progressively leaves a wider uncleaned up area until the center of the master is passed and the fin portions progressively approach each other. Fig. 5 represents the path of the tool 10 in a single traverse longitudinally of the work and pattern by the carriage 7.

Figure 6:
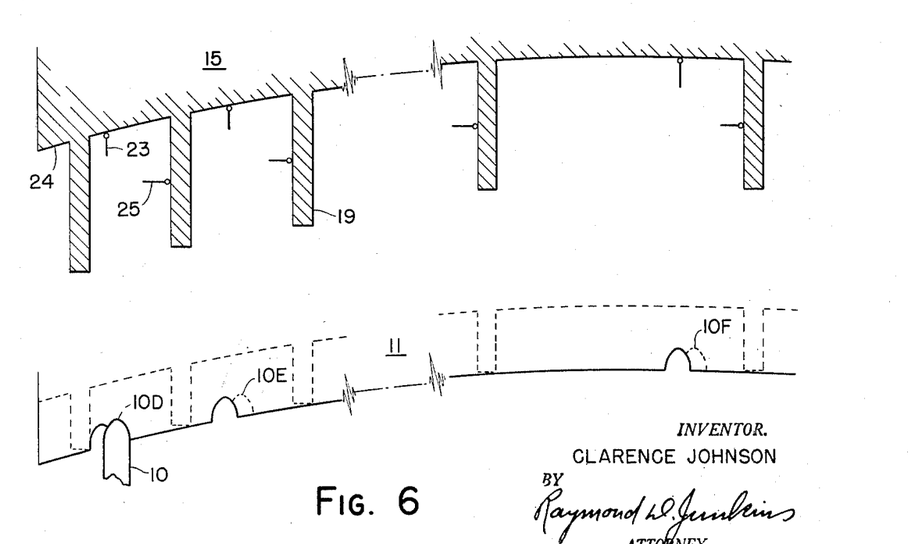

Fig. 6 illustrates a second cut across the work wherein the tool 10 has been started in an overlapping cut 10D, 10E and 10F. This is accomplished by starting the tool at the location 10D and, through the adjustment 29, shifting the feeler 23 toward the feeler 25, thus reducing the dimension M.

Figure 7:
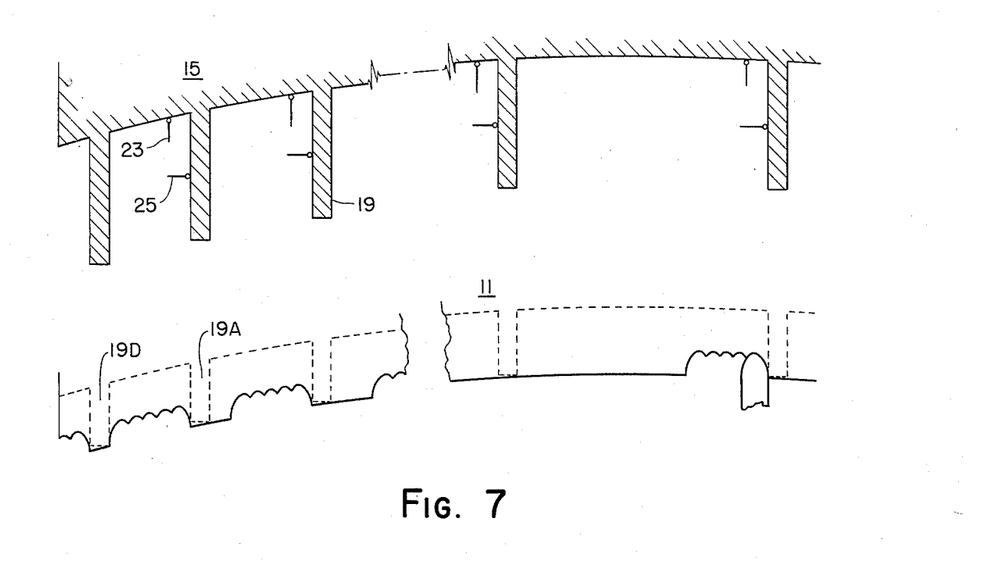

Referring now to Fig. 7, it will be observed that a succession of cuts have been made of substantially the same depth until the space between the fin portions 19D, 19A is machined out and the same width of cut is accomplished spirally throughout the entire length of the workpiece.

The assembly is again moved to the left to a starting position and the tool is advanced toward the center of the workpiece for a second succession of cuts to a greater depth between the fins. This is accomplished by proper relative adjustment of the compound 9 and tracer assembly 21, 22. While I have generally indicated the shape of the cutting tool 10 as being somewhat rounded, it will be appreciated that this shape depends upon numerous factors and the proper shape will be chosen for the material operated upon.

Figure 8:
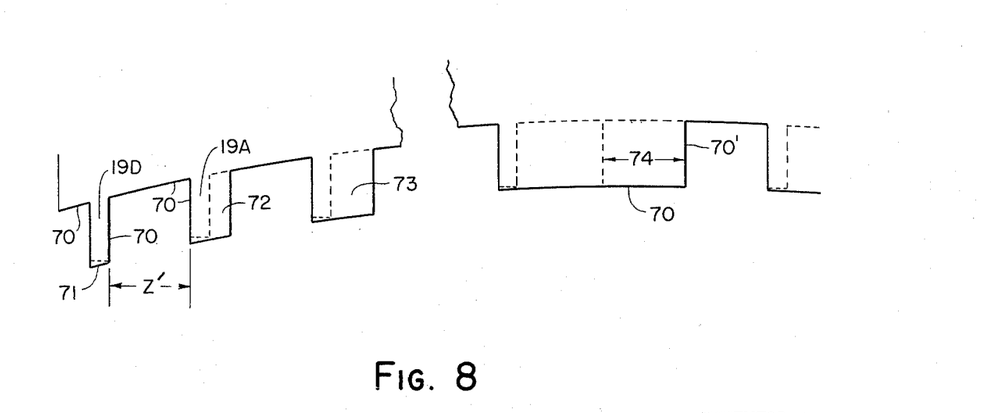

Successive series of spiraling cuts are taken across the workpiece, each series of increasing depth, and the final series perhaps with a differently shaped tool, so that a finished contour as represented in Fig. 8 in solid line as at 70 results with the desired sharp corners or fillets. The result is a spiralling channel cut into the surface of the workpiece 11 of a uniform width Z', which is the desired finished spacing between the first two sections 19D and 19A of the fin 19. The next operation may desirably be to contour machine the outer edge 71 of the fin 19A down to the dotted line desired shape.

It will be observed that the fin section 19A, 360° around the workpiece from the starting section 19D, is considerably wider than desired and progressively wider until the center of the workpiece is reached, and then progressively narrower until the right-hand (unshown) end of the workpiece again finds the distance Z' as desired.

It is next preferable to begin a series of machining operations from the right-hand end of the pattern and workpiece with travel of the carriage 7 from right to left and to have the feeler 25 trace the right-hand edge of the fin 19. Such a reversal of normal travel is accomplished as previously mentioned by switching the hand valve 58, whereafter normal travel of the piston 63 is from right to left. Performing a similar series of cuts to that just described, except for the direction of normal travel, the portions 72, 73 will be cleaned off at both ends of the workpiece, leaving perhaps an unfinished portion 74 in the very center of the workpiece. This portion may later be cleaned off by properly moving the elements 10, 21, and 22.

I have purposely illustrated and described the contour maching of a rather complicated and difficult structure including numerous problems to clearly illustrate the range of adjustment and operation of my preferred system. The machining operation would be considerably simplified if the fin 19 were wrapped around the base of the pattern at a uniform pitch. The operation might be simplified if the double curvature of the base portion were not curved, but were a straight taper. It would be simplified were the base portion cylindrical rather than tapered in any respect. However, the apparatus and system which I have invented is clearly shown to be applicable to a wide range of complicated turning operations wherein in general it may be said that two tracer assemblies are provided, one of the assemblies primarily controlling the longitudinal travel of the tool along the workpiece while the other assembly at the same time controls the transverse movement of the tool relative to the workpiece.

While I have illustrated and described a certain preferred embodiment of my invention it will be understood that I am not to be limited thereto inasmuch as the drawing and description are by way of example only.

What I claim as new, and desire to secure by Letters Patent of the United States, is:

1. In combination with a pattern controlled lathe having means for relatively moving a tool and workpiece along a first path parallel to the longitudinal axis of the lathe and along a second path at an angle to said first path, means for mounting a pattern for rotation about an axis parallel to the longitudinal axis of the lathe, means for mounting the workpiece for rotation about an axis in spaced parallel relation to the rotational axis of the pattern, and means for rotating the pattern and the workpiece in synchronism: a pattern having a body portion with the shape of a surface of revolution and a generally wormlike outward projection from said body portion, first tracer means continuously scanning the body portion of the pattern for controlling relative movement of the tool and workpiece along said second angular path, and second tracer means continuously and concurrently scanning the lateral surface of the wormlike projection of the pattern that is adjacent the body portion being scanned by said first tracer means for controlling relative movement of the tool and workpiece along said first parallel path.

2. In combination with a pattern controlled lathe having means for relatively moving a tool and workpiece along a first path parallel to the longitudinal axis of the lathe and along a second path at an angle to said first path, means for mounting a pattern for rotation about an axis parallel to the longitudinal axis of the lathe, means for mounting the workpiece for rotation about an axis in spaced parallel relation to the rotational axis of the pattern, and means for rotating the pattern and workpiece in synchronism: a pattern having a body portion with the shape of a surface of revolution and a helical fin projection from said body portion, said fin being of greater height than the fin to be formed on the said workpiece, first tracer means continuously scanning the body portion of the pattern for controlling relative movement of the tool and workpiece along said second angular path, and second tracer means continuously and concurrently scanning the lateral surface of the fin projection of the pattern that is adjacent the body portion being scanned by said first tracer means for controlling relative movement of the tool and workpiece along said first parallel path.

CLARENCE JOHNSON.

REFERENCES CITED

The following references are of record in the file of this patent:

UNITED STATES PATENTS

| Number | Name | Date |
| --- | --- | --- |
| 468,283 | Guerrant | Feb. 2, 1892 |
| 1,959,178 | Sassen | May 15, 1934 |
| 2,332,532 | Roehm | Oct. 26, 1943 |
| 2,359,704 | Woody | Oct. 3, 1944 |
| 2,372,427 | Johnson | Mar. 27, 1945 |
| 2,412,549 | Yates | Dec. 10, 1946 |
| 2,424,031 | Heer | July 15, 1947 |

FOREIGN PATENTS

| Number | Country | Date |
| --- | --- | --- |
| 210,306 | Switzerland | June 30, 1940 |